Nov. 18, 1958  R. BECKADOLPH ET AL  2,860,379
METHOD OF CENTRIFUGALLY CASTING VEHICLE TIRES
Filed April 20, 1955  2 Sheets-Sheet 1

INVENTORS:
Richard Beckadolph
and
Walter Niclas
By 2,860,379
Patented Nov. 18, 1958

2,860,379
METHOD OF CENTRIFUGALLY CASTING VEHICLE TIRES

Richard Beckadolph, Grasdorf uber Hannover, and Walter Niclas, Altwarmbuchen, Hannover, Germany, assignors to Continental Gummi-Werke Aktiengesellschaft, Hannover, Germany Application April 20, 1955, Serial No. 502,582

Claims priority, application Germany April 24, 1954

4 Claims. (Cl. 18—58.3)

The present invention relates to pneumatic tires with reinforcing inserts and more particularly, concerns a method of making such tires from pourable elastic materials, especially polyamides or polyurethanes while employing a mandrel for receiving the reinforcing inserts and while carrying out the manufacture of such tires in conformity with the centrifugal casting method.

When making tires of the above identified character according to the centrifugal casting method, considerable difficulties are encountered caused by the reinforcing inserts. Numerous attempts have been made to make possible the manufacture of pneumatic tires with reinforcing inserts according to the very advantageous centrifugal casting method. However, the heretofore known methods of making rubber tires provided with reinforcing inserts do not furnish any pattern or hints which could be followed or taken advantage of in order to find a way of employing the centrifugal casting method for making reinforced tires. With the heretofore known method of making reinforced tires, the reinforcements are pretreated and covered with rubber or the like so that the reinforcing inserts will be enclosed by rubber layers from all sides. The thus pretreated fabric layers are then combined with layers consisting of rubber only to an unfinished work piece. Only after the buildup of such unfinished work piece has been completed, in other words, only after the reinforcing inserts are fully enclosed by a rubber layer, does the actual molding and vulcanization of the unfinished work piece take place. Therefore, during the manufacture of the unfinished work piece and also during the vulcanization thereof, a displacement of the reinforcing inserts cannot take place or only to a negligible extent. If, however, pourable elastic materials are employed and the tire is to be obtained by a casting method, non-covered reinforcing inserts are employed which are enclosed during the casting process only so that particular attention has to be paid to the proper anchoring or securing of the reinforcing inserts during the casting operation in order to prevent displacements from occurring during the casting process proper. This problem does not occur with reinforced rubber tires made in conformity with the methods heretofore known. When employing the centrifugal casting method, also considerable centrifugal forces occur which have to be resisted by the reinforcing inserts.

It is, therefore, an object of this invention to provide a method of making pneumatic tires with inserted reinforcements, while employing the centrifugal casting method.

It is another object of this invention to provide a method of making pneumatic tires with inserted reinforcements while employing the centrifugal casting method, which will make it possible safely to secure the reinforcements in their respective positions during the casting operation.

It is still another object of this invention to provide a centrifugal casting method for pneumatic tires which will safely anchor the reinforcing inserts while allowing the placing of non-covered reinforcing inserts upon a non-covered smooth mandrel in conformity with heretofore known practice.

These and other objects and advantages of the invention will appear more clearly from the following specification in connection with the accompanying drawings in which.

General arrangement

Figure 1:
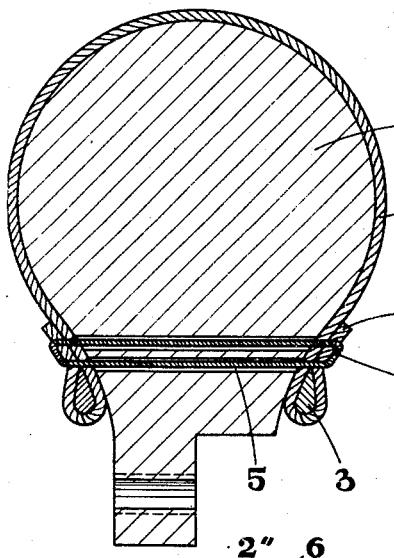
Fig. 1 is a radial section through a mandrel which is covered with reinforcing inserts and, after placement of the reinforcing inserts thereon can be placed into any standard centrifugal casting mold.

The problem of mass producing pneumatic tires with reinforcements therein while employing the centrifugal casting method has been solved by the present invention which is characterized in that during the casting process the free ends of the reinforcing inserts, which ends extend around the cores of the tires, are anchored mechanically and/or by adhesion. Surprisingly it has been found that the anchoring of said free ends of the reinforcing inserts fully suffices in order to secure the position of all reinforcing inserts i. e. those portions of said inserts which are located between the free ends of said inserts. The arrangements of reinforcing inserts is advantageous also insofar as the heretofore known working steps and the heretofore required devices for placing the reinforcing inserts upon an uncovered smooth mandrel may be maintained. In order to carry out the above outlined suggestion according to the present invention, it is merely necessary to anchor the free ends of the reinforcing inserts after the reinforcing inserts have been built up and have been placed upon the mandrel in customary manner.

The anchoring of the free ends of the reinforcing inserts can best be effected by providing the mandrel intended for the casting mold with transverse bores distributed over the circumference of said mandrel. Said transverse bores may be arranged axially or in an inclined manner. After the reinforcing inserts have been prepared, said bores will serve to receive threads or wires which in their turn secure the position of the reinforcing inserts and also secure the position of the cores.

According to a further development of the invention, the free ends of the reinforcing inserts which ends pass around the cores are in a manner known per se passed up to the zenith portion of the mandrel in such a manner that the free ends of the reinforcing inserts are arranged in abutment one in front of another or are arranged in spaced relationship with regard to each other or overlap each other. In order to anchor said reinforcing inserts, according to the present invention, annular bandages are employed which are passed around the outer circumference of the mandrel and are preferably made of fabric. The elasticity of the bandage may be obtained by employing a fabric cut on a diagonal.

Structural arrangement

Referring now to the drawings in detail and Fig. 1 thereof in particular, reinforcing inserts 2 are placed upon the mandrel 1 and extend around the cores 3 which later on extend through the beads of the tire. After the reinforcing inserts 2 have been placed over the mandrel 1 by devices not shown in the drawing, the cores 3 are caused to engage said inserts and the free ends 2 are passed around said cores. The anchoring of the free ends 2' is effected by wires or threads 4 which are passed through transverse bores 5 of the mandrel 1 and looped back and forth so that the free ends 2' of the reinforcing inserts are pressed against those portions of the reinforcing inserts which are directly engaged by the respective core.

The arrangement of Fig. 1 is advantageous insofar as due to the presence of the threads 4, the reinforcing inserts 2 as well as the cores 3 are secured against undesired displacements during the centrifugal casting operation.

Figure 3:
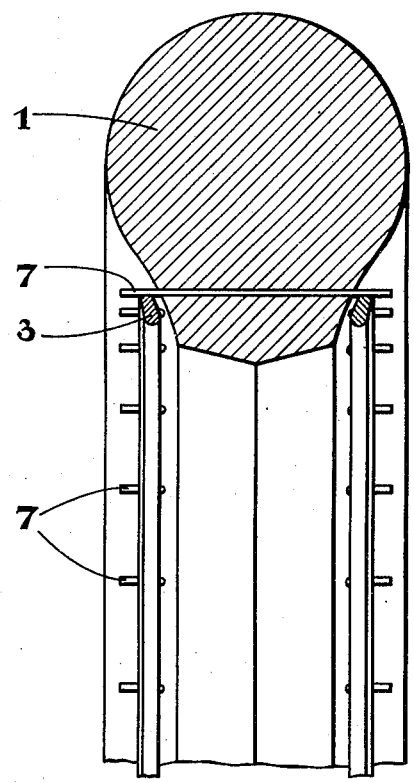
Figs. 2 and 3 are likewise radial sections through a mandrel having reinforcing inserts placed thereon and respectively showing positioning or centering pins for the cores of the tire to be produced.
Figure 2:
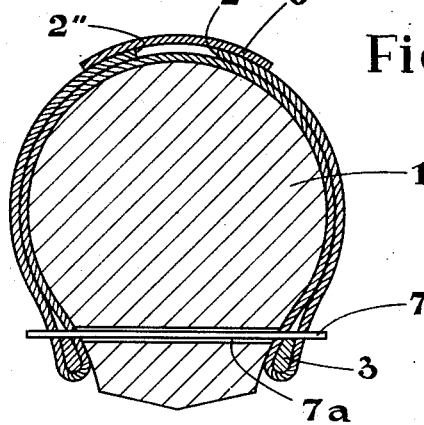

According to the embodiment of the invention shown in Fig. 2, the free ends 2'' are passed up to the zenith portion of the mandrel 1, and the anchoring of the ends 2'' is effected by an annular elastic bandage 6 which under a certain preload is passed over the outermost circumference of the mandrel thereby bringing about the desired anchoring of the ends 2''. Pins or bolts 7 extend through those surfaces of the mandrel which are adjacent to the beads to be formed, said pins or bolts 7 being detachably or fixedly arranged in corresponding transverse bores of the mandrel 1. Thus, according to Fig. 2 the bores 7a (one only being shown in Fig. 2) in mandrel 1 have a diameter somewhat greater than the outer diameter of the pins or bolts 7 so that said pins or bolts can easily be introduced into or removed from the bores 7a in the mandrel 1. According to Fig. 3, the pins or bolts 7 are press fitted into transverse bores of the mandrel so that they can be distributed over the circumference in fixed arrangement with regard to each other and said mandrel. The purpose of the pins or bolts 7 consists in positioning and centering the cores 3.

The pins or bolts 7 are preferably uniformly distributed over the entire circumference of the mandrel. In this way a kind of cage is formed into which the cores 3 can be inserted from the sides of the mandrel. The cores are thus centered with regard to the mandrel 1 when they are arranged between the pins or bolts 7. The cores are fixed in their positions inasmuch as the pins or bolts prevent a displacement of said cores and do so also during the centrifugal casting process which fact is of extreme importance in connection with the casting process. It has been proved expedient so to locate the circle along which the bores for the pins or bolts 7 are located that the cores 3 are clamped in between bolts or pins 7 arranged at diametrically opposite points (see Fig. 3).

Figure 4:
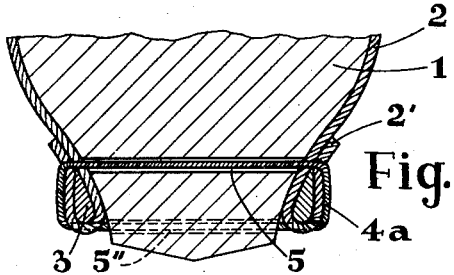
Fig. 4 is a partial section through a mandrel and illustrates a method of anchoring the ends of the reinforcing inserts, which method is somewhat different from that shown in Fig. 1.
Figure 5:
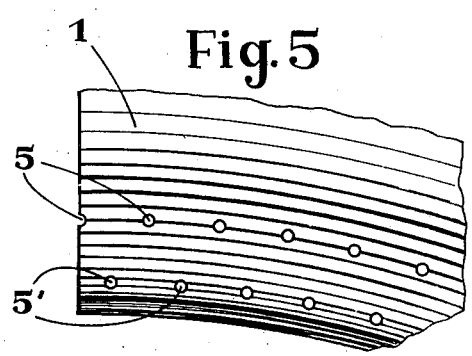
Fig. 5 illustrates a staggered arrangement of the bores through which the wires or threads for anchoring the ends of the reinforcing inserts are passed.

According to the embodiment shown in Fig. 4 the threads 4a are looped around the free ends 2' of the reinforcing inserts and also about the cores 3. The transverse bores 5' shown in dash lines in Fig. 4 are staggered in circumferential direction with regard to the bores 5 arranged at a higher level as is clearly shown in Fig. 5 so that, when employing a plurality of bores 5 and 5' distributed over the circumference of the mandrel 1, a thread 4 can be employed which is passed through the respective bore 5 and then through the respective bore 5' arranged below.

Figure 6:
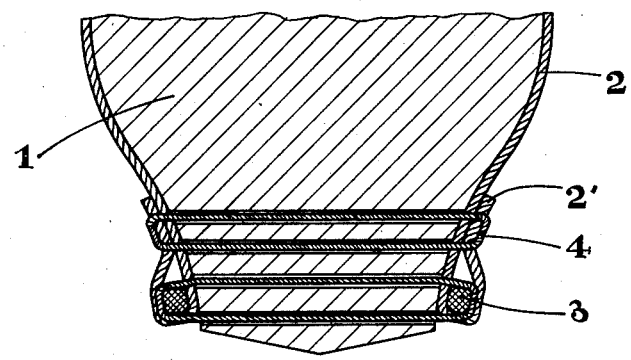
Fig. 6 is a partial cross section through a mandrel having reinforcing inserts placed thereon and shows a still different way of anchoring the reinforcing inserts.

According to Fig. 6, in addition to the anchoring of the free ends 2', there is provided an additional anchoring for the cores 3. Such an arrangement is advantageous when pneumatic vehicle tires are to be made which are reinforced by a plurality of superimposed fabrics and in which instances it is not always possible to secure the free ends 2' in conformity with Figs. 1 and 4. It may be added that the desired anchoring may also be brought about by adhesion between the free ends 2' and the reinforcing inserts 2 engaging the mandrel 1. If desired, also a mechanical anchoring as well as an anchoring of the free end 2' by an adhesive means may be effected.

Figure 7:
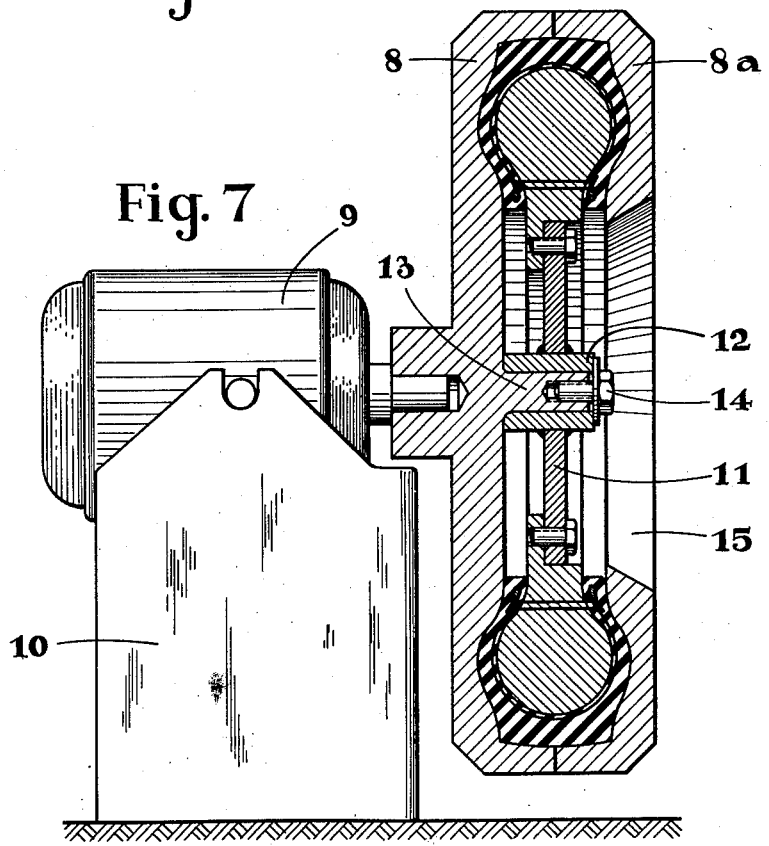
Fig. 7 is a partial section through a centrifugal casting machine having a tire carcass located therein for producing a tire in conformity with the present invention.

In order to illustrate how a vehicle tire may be cast centrifugally in conformity with the present invention, Fig. 7 diagrammatically illustrates a centrifugal casting machine. The two parts of the mold are designated with the reference numerals 8 and 8a. The arrangement furthermore comprises a drive motor 9, for instance an electric motor having the mold 8, 8a connected thereto so as to rotate said mold. The motor 9 is supported by the frame 10. After the inserts 2 and cores 3 have been placed upon the mandrel 1, the latter is by means of a disc 11 and a bushing 12 connected thereto placed upon the stud 13 forming a part of the mold section 8. The front portion of the stud 13 is provided with a thread for receiving a nut 14 in order firmly to hold the bushing 12 on the stud 13. Thereupon the mold half 8a is placed on the mold 8 and connected thereto in any customary manner. The mold is then rotated while material is filled into the mold through the aperture 15. The quantity of material to be filled into the mold through aperture 15 must, of course, be sufficient to fill the cavity corresponding to the cross section of the tire to be produced. The mold is rotated until a solidification of the material has occurred. After said solidification, the mold 8, 8a is opened and the disc 11, 12 is removed.

If desired, the centrifugal casting method may be followed by a short heat treatment which will be beneficial for the polymerization of the usually employed synthetic materials. Finally the tire is removed from its mandrel. In order to facilitate this removal, also a collapsible mandrel may be employed.

It may be added that the centrifugal casting machine itself as well as the cores employed do not form a part of the present invention.

It is, of course, to be understood that the present invention is, by no means, limited to the particular constructions shown in the drawings but also comprises any modifications within the scope of the appended claims.

What we claim is:

1. In a method of making vehicle tires from elastic materials while employing an annular mandrel, the steps of: placing reinforcing means having two free ends on and about said mandrel, placing cores against those portions of said reinforcing means where beads are to be formed, folding the free end of said reinforcing means about said cores so that said free ends will be located near the circumferential portion of said mandrel while securing said cores in their desired respective positions relative to said mandrel, tightly placing an annular bandage over the thus located free ends of said reinforcing means only to thereby non-displaceably secure the respective portions of said free ends relative to said mandrel, and centrifugally casting elastic material around said bandage and said reinforcing means.

2. A method according to claim 1, in which a polyamide is employed as elastic material centrifugally cast around said bandage and said reinforcing means.

3. A method according to claim 1, in which a polyurethane is employed as elastic material centrifugally cast around said bandage and said reinforcing means.

4. In a method of making vehicle tires from elastic materials while employing an annular mandrel, the steps of: placing reinforcing means having two free ends on and about said mandrel, placing cores against those portions of said reinforcing means where beads are to be formed, folding the free ends of said reinforcing means about said cores so that said free ends will be located near the circumferential portion of said mandrel, passing connecting means around said reinforcing means in immediate vicinity of said cores and through said mandrel to firmly secure said cores in their respective desired positions relative to said mandrel, tightly placing an annular bandage over only the free ends of said reinforcing means near the circumferential portion of said mandrel to thereby non-displaceably secure the respective portions of said free ends relative to said mandrel, and centrifugally casting elastic material around said bandage and said reinforcing means.

References Cited in the file of this patent

UNITED STATES PATENTS

| | | |
|---|---|---|
| 969,131 | Cobb | Aug. 30, 1910 |
| 1,402,947 | Myers | Jan. 10, 1922 |
| 1,527,206 | Marquette | Feb. 24, 1925 |
| 1,529,654 | Hurt | Mar. 17, 1925 |
| 1,539,923 | Tuttle | June 2, 1925 |
| 2,446,281 | Harding | Aug. 3, 1948 |
| 2,542,757 | Dubin | Feb. 20, 1951 |
| 2,620,516 | Muller | Dec. 9, 1952 |
| 2,625,981 | Wallace | Jan. 20, 1953 |
| 2,629,130 | Rempel | Feb. 24, 1953 |
| 2,686,554 | Hinman | Aug. 17, 1954 |
| 2,712,157 | Holte | July 5, 1955 |
| 2,729,618 | Muller et al. | Jan. 3, 1956 |